US011940363B1

(12) United States Patent
Alsayegh et al.

(10) Patent No.: US 11,940,363 B1
(45) Date of Patent: Mar. 26, 2024

(54) SYSTEM FOR MONITORING AND ENHANCING THE PHYSICAL STABILITY OF DISPERSED PARTICLES IN FLOWING SUSPENSIONS

(71) Applicant: KUWAIT UNIVERSITY, Safat (KW)

(72) Inventors: Naser Alsayegh, Safat (KW); Nawaf F. Aljuwayhel, Safat (KW)

(73) Assignee: KUWAIT UNIVERSITY, Safat (KW)

( * ) Notice: Subject to any disclaimer, the term of this patent is extended or adjusted under 35 U.S.C. 154(b) by 0 days.

(21) Appl. No.: 18/127,559

(22) Filed: Mar. 28, 2023

(51) Int. Cl.
*G01N 11/04* (2006.01)
(52) U.S. Cl.
CPC .................... *G01N 11/04* (2013.01)
(58) Field of Classification Search
CPC ............................................. G01N 11/02–04
See application file for complete search history.

(56) References Cited

U.S. PATENT DOCUMENTS

| | | | |
|---|---|---|---|
| 3,677,069 A | 7/1972 | Rubin et al. | |
| 3,777,551 A | 12/1973 | Weiss | |
| 5,315,863 A | 5/1994 | Cowper | |
| 5,393,714 A | 2/1995 | Thometzek et al. | |
| 11,084,036 B2 | 8/2021 | Bharadwaj et al. | |
| 11,353,386 B1 | 6/2022 | Alsayegh et al. | |
| 2013/0217833 A1 | 8/2013 | Paul et al. | |
| 2017/0101910 A1 | 4/2017 | Reinosa | |
| 2018/0036911 A1* | 2/2018 | Dubey | B28B 13/0275 |
| 2018/0070627 A1 | 3/2018 | Burton et al. | |
| 2019/0308342 A1* | 10/2019 | Butler | E04G 21/0436 |
| 2021/0371769 A1 | 12/2021 | Monden et al. | |
| 2023/0023417 A1* | 1/2023 | Karamanos | G01F 25/10 |

FOREIGN PATENT DOCUMENTS

| | | |
|---|---|---|
| DE | 100 55 420 A1 | 5/2002 |
| DE | 10 2007 042 109 A1 | 3/2009 |
| ES | 2 188 323 A1 | 6/2003 |

OTHER PUBLICATIONS

"Learn what to expect from centrifugal, reciprocating and rotary pumps," Hydraulic Institute, Apr. 6, 2018.

* cited by examiner

*Primary Examiner* — Kristina M Deherrera
*Assistant Examiner* — Fatemeh Esfandiari Nia
(74) *Attorney, Agent, or Firm* — Nath, Goldberg & Meyer; Richard C. Litman

(57) ABSTRACT

Flow characteristics are measured by providing a flow path from a flow supply source through a flow restriction passage. A plurality of movable fins are extendable into the flow restriction passage, resulting in a change in the flow characteristic of the flow restriction passage. The movable fins are controlled and a flow measurement device is used for measuring flow or flow resistance through the flow restriction passage with the movable fins extended and retracted.

10 Claims, 5 Drawing Sheets

SYSTEM FOR MONITORING AND ENHANCING THE PHYSICAL STABILITY OF DISPERSED PARTICLES IN FLOWING SUSPENSIONS

BACKGROUND

Technical Field

The disclosed technology relate generally to measuring and enhancing suspension properties. More specifically, the disclosure relates to a technique for determining and improving the physical stability of suspensions in a dynamic flow state.

Background Art

Flow and viscosity of monolithic fluids such as compounds and fully dissolved mixtures is generally a straightforward measurement, based on the measurement of poise (P), frequently given in centipoise (cP). For monolithic materials, this is measured by simple flow techniques, or even by timing the passage of the fluid through an orifice and comparing the trifle of flow to that of a standard fluid. Such measurements are achieved by an instrument called a viscometer, viscosity meter or rheometer, with results given as flow, viscosity or shear viscosity. In the case of liquid suspensions, slurries and other materials which have discrete non-dissolved components, such measurements can be complicated by the mechanical interaction of the materials with the flow measurement apparatus. A familiar example of this is found in the dispensing of bulk food such as coffee beans through a dispensing opening, in which the material may sometimes block its own flow.

It is therefore desired to provide a flow measurement technique that can provide an indication of flow characteristics of materials which are subject to discontinuous flow.

SUMMARY

Flow characteristics are measured by providing a flow path from a flow supply source through a flow restriction passage. A flow restrictor, such as a plurality of movable tins, is extendable into the flow restriction passage, resulting in a change in the flow characteristic of the flow restriction passage. An actuator is used for controlling the flow restrictor; and a flow measurement device is used measuring flow or flow resistance through the flow restriction passage. The flow restrictor causes a disruption of flow, and thereby functions as a homogenizer mixer. Multiple flow restrictors can be provided.

In one configuration, flow is maintained with a pump and changes in power applied to the pump to maintain the flow at a predetermined flow rate is used to measure flow characteristics.

In another configuration, the flow restrictor is intraoperative with the pump and is incorporated in a feedback loop with the pump. This allows flow restrictions, flow rate and power provided to operate the pump to be used to evaluate the flow characteristics of the material passing through the system.

BRIEF DESCRIPTION OF THE DRAWINGS

FIG. 1 is a schematic diagram showing a flow restriction passage.

FIGS. 2A-2C are schematic diagrams showing the extension of fins from the flow passage of FIG. 1. FIG. 2A shows no extension (0° extension); FIG. 2B shows partial extension of the fins, for example 45° extension; and FIG. 2C shows a full extension of the fins, for example approximately a 90° extension with respect to the direction of flow.

FIG. 3 is a schematic diagram showing a flow measurement system using the flow restriction passage of FIG. 1.

DETAILED DESCRIPTION

The disclosed technique provides for determining and enhancing the physical stability of suspensions, including nanofluids, microfluids, solid particles/liquid mixture, liquid suspensions or slurries, in a dynamic flow state. The system includes a cylindrical container for a sample material, including a solid particles/liquid mixture, liquid suspension or slurry, a glass or acrylic pump, a valve between the container and the pump, and associated pipes to direct the suspension from the pump back to the container. The technique starts by first establishing the suspension by putting the particles and liquid into the container and then inserting the probe of a homogenizer instrument into the container to mix the solid particles and liquid, thus forming the suspension. The valve is then opened, and the pump is turned on to circulate the suspension through the device. Changes in the effective viscosity of the suspension can be determined by the changes in the pumping power requirements. When the dispersed particles lose their physical stability within the suspension, as a result of clustering or agglomeration between the particles, the effective viscosity of the suspension increases, and the pumping power requirements of the system subsequently increase as well.

The technique provides additional improvement to the monitoring of physical stability of the sample material or suspension by using turbulators or devices causing turbulence. When conducting a physical stability test or evaluation at a selected flow rate, the pumping power is continuously monitored and recorded and, for example, corrected when needed by using the turbulators and using a personal computer. The data so collected can then be used to determine the physical stability of the examined working fluid. The pumping power or the correction of pumping power can be used as a measurement of the flow resistance or stability of flow of the examined working fluid.

A heating/cooling jacket may optionally be placed about the container, to control dispersion temperature during both fabrication and operational stages.

The technique provides an approach for enhancing or improving the physical stability of dispersed particles in dynamically flowing suspensions, including nanofluids and microfluids using fin projections as turbulators. As used herein, "fins" and "turbulators" are used interchangeably. The turbulators can be remotely controlled. and can be set to manual or automatic, to add additional mixing to the dispersed particles once the suspension is flowing in the system.

in a non-limiting example, during the flow, the suspension, in its dynamic flow condition, starts to lose its dispersed particles physical stability. The turbulators, as deployed, form an array of fins that can be moved from 0 degrees to 90 degrees within an inner pipe, by clockwise and counter-clockwise gear movements. The turbulators can be placed in any location within the system because the device is designed to be connected between two tubes; however, the location can be advantageously after the pump and flow rate sensor.

As indicated previously, the preparation of the suspension is performed within the device using an attached homogenizer mixer. This will eliminate any additional mixing to the suspension from transferring it from an external mixing device to the examining cycle. In other words, the only mixing that occurs for the suspension occurs within the disclosed system. It is noted that any additional mixing would change the level of physical stability of the dispersed particles within the suspension. In addition, it is possible to use an externally pre-prepared suspension if desired.

The disclosed device is more accurate than a particles size analyzer, which overpredicts the dispersed particles size and counts the shadow of particles as actual particles.

Figure 1:
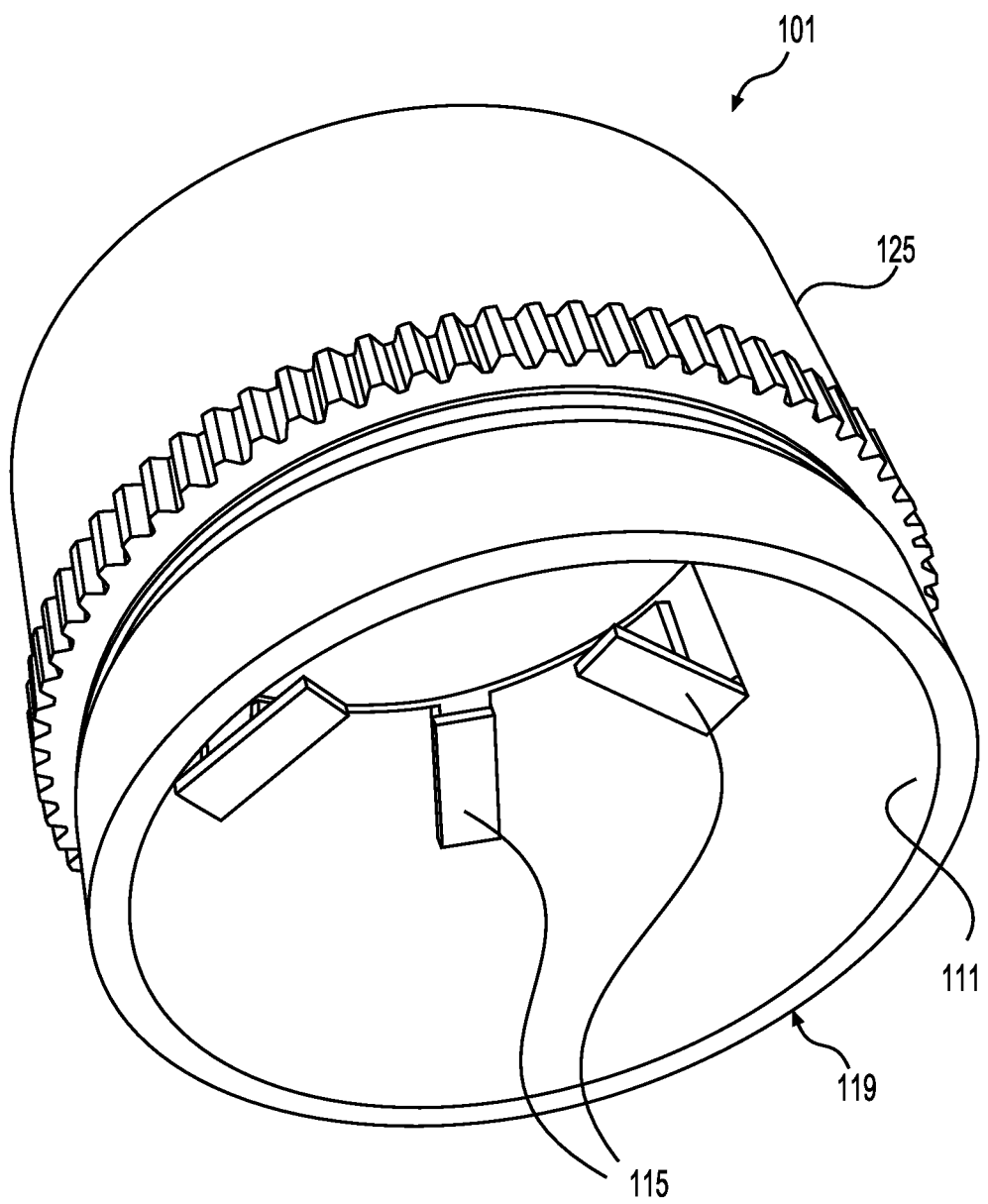

FIG. 1 is a schematic diagram showing a flow restriction passage 101 used to implement the disclosed technique. FIG. 1 shows the inside flow passage 111 with extendable fins 115. The extendable fins function as turbulators. Inside flow passage 111 is part of flow shell 119, with inside flow passage 111 formed in a conical shape or another format, which results in a venturi effect within flow shell 119. Material such as a fluid, liquid suspension or slurry passes through inside flow passage 111 with the extension of fins 115 acting to interrupt flow as the suspension passes through.

Outer gear drive housing 125 is driven by drive gear motor 131 (see FIGS. 2A-2C and FIG. 3) to cause outer drive housing 125 to rotate about flow shell 119 and drives fins 115 to cause drive fins 115 to extend or retract into or against the inner walls of flow shell 119 that form inside flow passage 111. By way of non-limiting example, fins 115, when retracted, are substantially flush with inside flow passage 111, but a significant aspect is that fins extend and retract to change the flow characteristics of inside flow passage 111.

The fins 115 function as turbulators, which are caused to move by drive gear motor 131 and outer drive housing 125 to extend or retract into or against the inner walls of flow shell 119. This mechanism controls movement of fins 115. By way of non-limiting example, fins 115 can be moved within a range from 0 degrees to 90 degrees, which creates varying degrees of interference with flow through flow shell 119.

Figure 2A:
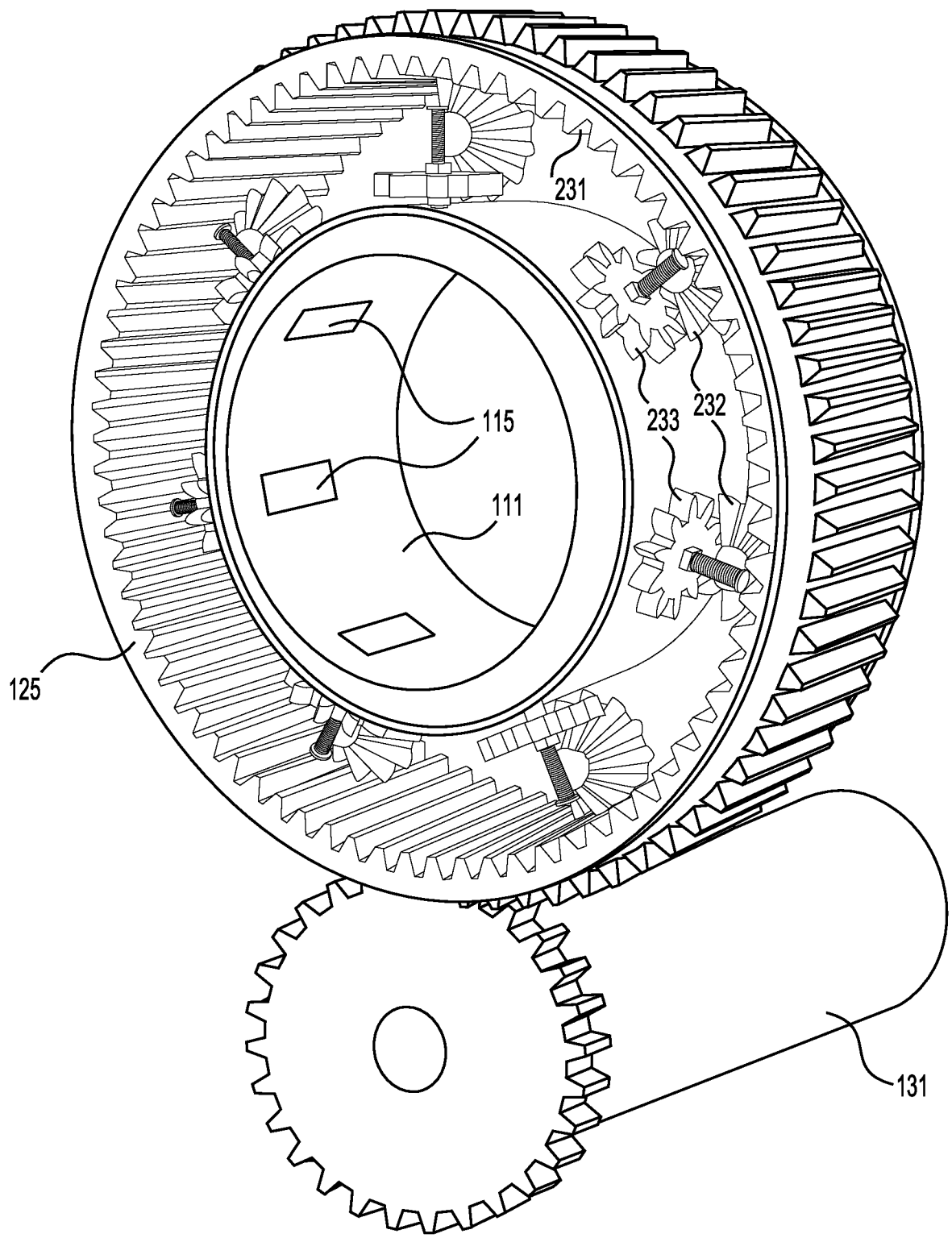
Figure 2B:
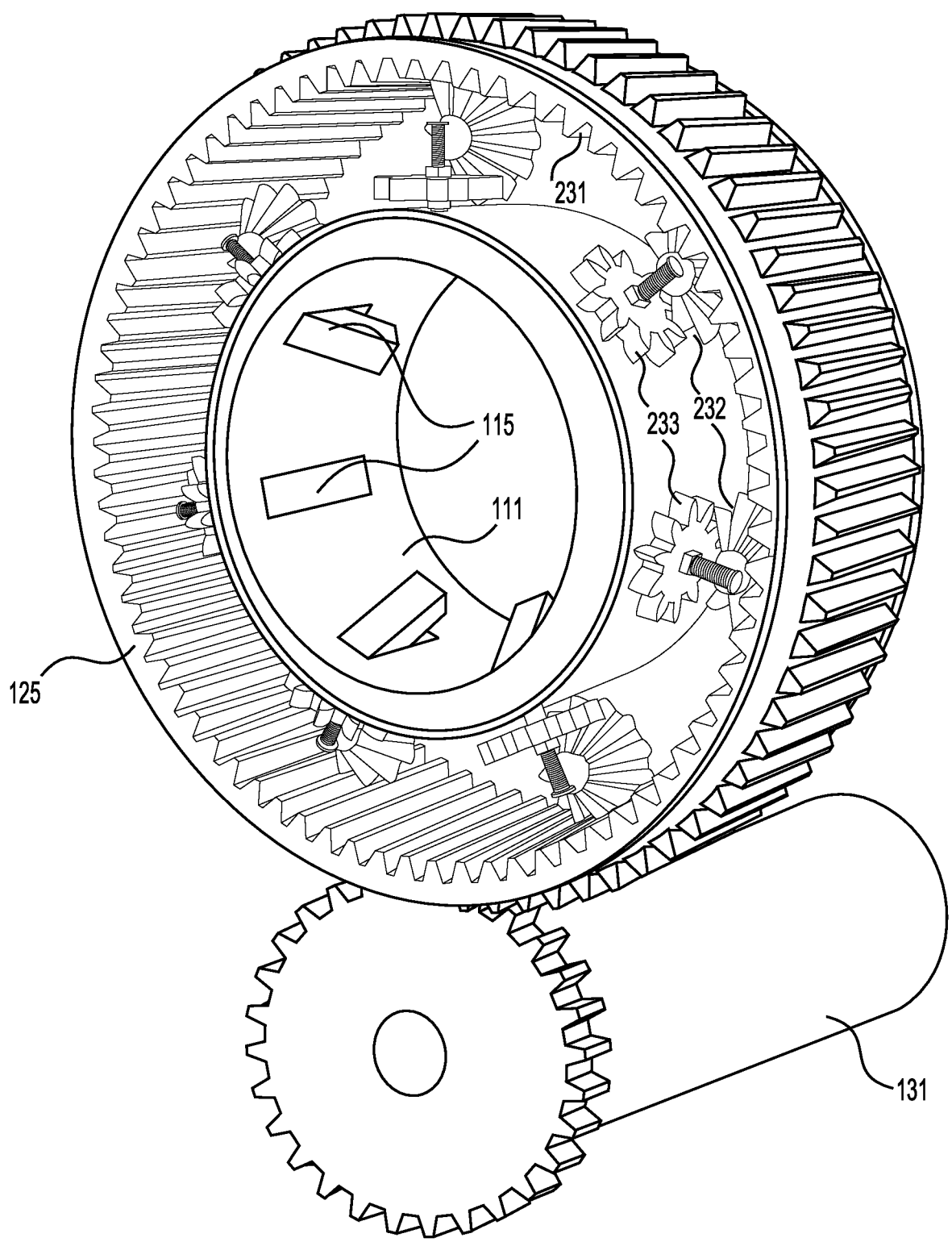
Figure 2C:
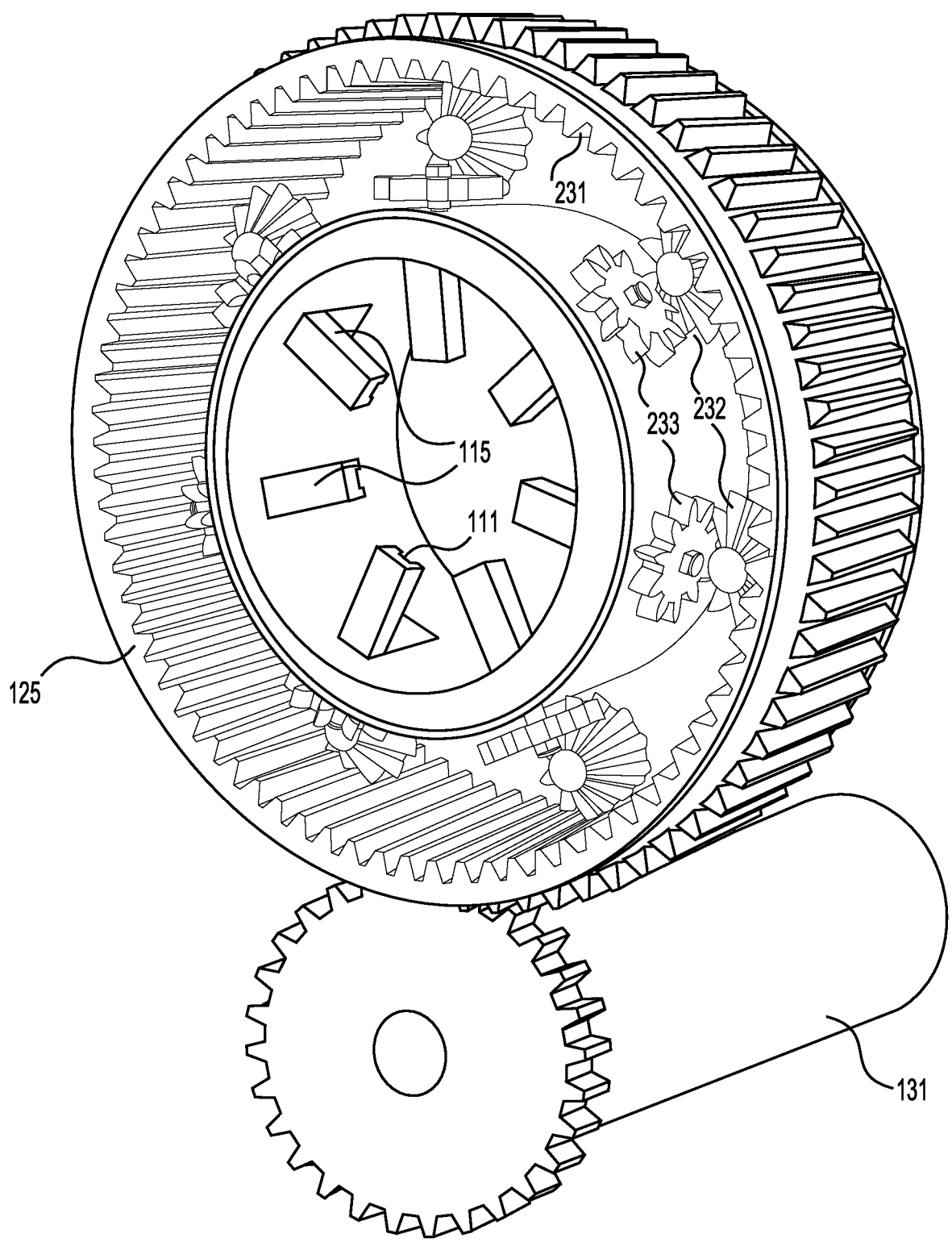

FIGS. 2A-2C are schematic diagrams showing the extension of fins 115 from flow passage 111. FIG. 2A shows no extension (0° extension), with fins 115 flush against the inner wall of the inside flow passage 111. FIG. 2B shows partial extension of fins 115, for example 45° extension. Depending on the amount of turbulence desired to disrupt the agglomeration, fins 115 can be set to any degree of extension between 0 degrees and 90 degrees. FIG. 2C shows a full extension of fins 115, for example approximately a 90° extension. In each case, rotation of outer drive housing 125 or a similar mechanical movement is translated to extension or retraction of fins 115. In a particular aspect of the present device, a gear actuator causes the movable tins to extend or retract into the flow restriction passage. The gear actuator includes a rotating gear driving a plurality of driven gears corresponding to the plurality of the movable fins, whereby rotation of the rotating gear causes the plurality of movable fins to synchronously extend or retract.

Still referring to FIGS. 2A-2C, outer gear housing 125 has internal gear 231, which in turn drives a set of intermediate gears 232. Intermediate gears 232 drive fin extending gears 233, which in turn extend and retract fins 115. The linkage of fin extending gears 233 to tins 115 may be via any convenient means, such as a direct drive connection between fin extending gears 233 and fins 115, via pins and slots (not shown) or another connection causing fins 115 to move responsive to movement of extending gears 233. In this regard, it is noted that the specific mechanism for controlling extension of fins 115 is given by way of non-limiting example. Within this non-limiting embodiment, the actuator controlling the movable fins is controlled as interoperative with the drive circuit for the pump (described further below), with the position of the movable tins and power required to maintain a predetermined flow through the flow restriction passage providing data to evaluate flow characteristics of the material passing through the system.

Figure 3:
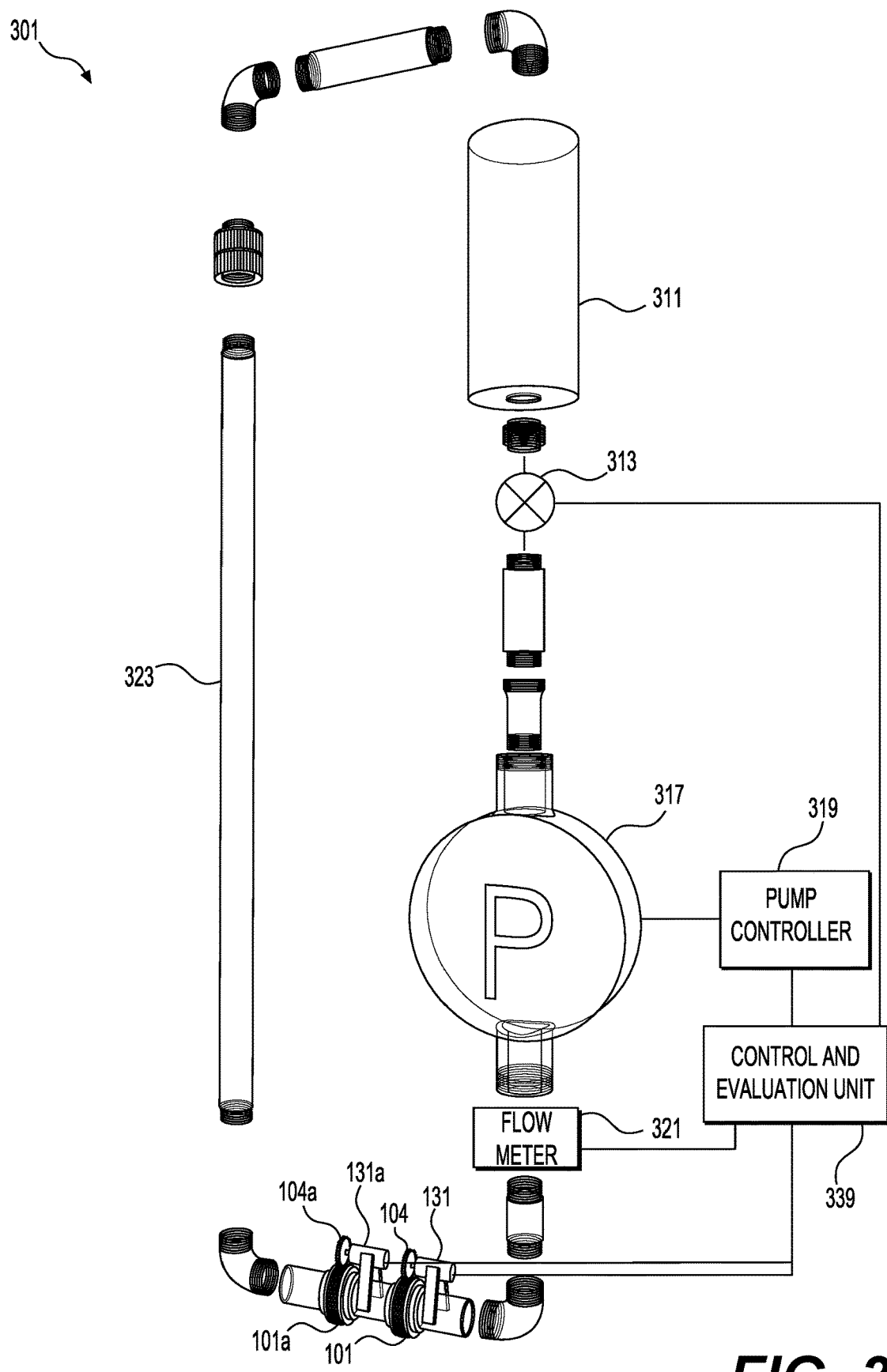

FIG. 3 is a schematic diagram showing a flow measurement system 301 using the flow restriction passage 101 of FIG. 1. Shown are flow restriction passage 101 with gear drive 104, supply container 311, supply valve 313, pump 317, pump controller 319, flow meter 321 and return line 323. The flow lines are provided as low friction materials, such as, by way of non-limiting example, glass, to minimize the frictional effect between the suspension and the hosting tubes surface.

While a single flow restriction passage 101 is shown, it is possible to provide multiple flow restriction passages located at various positions within the system, thereby providing multiple stages of turbulators for flow control. In addition, while a certain number of fins are shown in the Figures, it is also understood that the number of fins shown is not to be limiting in that more or fewer fins can be used within the scope of the present device and system, that the shown number of fins is for illustrative purposes only.

Pump controller 319 is used to control power used to run pump 317. While a separate flow meter 321 is shown, flow sensing can be performed by measuring negative pressure at the venturi formed by flow restriction passage 101. The measured flow can be maintained by adjusting power applied by pump 317 by pump controller 319, so adjustments in power applied by pump 317 can be equated to flow resistance through flow restriction passage 101. Pump controller 319 includes a drive circuit for the pump capable of providing driving current to operate the pump. The drive circuit provides an indication of power required to maintain a predetermined flow through the flow restriction passage, and thereby provide a comparison between the power required to maintain the predetermined flow with the movable fins extended into the flow restriction passage and the power required to maintain the predetermined flow with the movable fins not extended into the flow restriction passage.

The operation of the turbulator can be performed automatically within the system itself, by use of fins 115. This provides a homogenizer instrument in a two-step method. In the two-step method, flow control is provided by the flow of a mixture, comprised of base fluid and particles, from supply container 311. Control of pump 317 through pump controller and drive gear motor 131 in response to flow measurements and the measurements of flow and power supplied through pump controller 319 is achieved through control and evaluation unit 339. Control and evaluation unit 339 can be implemented through any suitable computer control, process controller or machine controller as is well-known to those skilled in the art of computer controlled processes. Control and evaluation unit 339 includes the necessary hardware and software to control the pump controller and the drive gear motor.

Supply container 311 can be provided with a capability of controlling the mixture temperature at the fabrication stage, for example through a heating/cooling jacket that comprises the shell of supply container 311 and a thermocouple or other thermal sensor. It is also important to note that the heating/cooling jacket and the homogenizer may both be controlled remotely through an external control system (shown as pump controller 319). The suspension temperature can be controlled at the production stage using a heating/cooling jacket. The suspension preparation and heating/cooling as well as opening supply valve 313 are all controlled through an external controlling system with built-in date receiver, analyzer and storage.

Once the preparation of the suspension is completed, supply valve 313 below supply container 311 is remotely opened after setting the targeted flow rate to start the testing, using pump controller 319. The mechanism in which the flow rate is adjusted is by increasing/decreasing the pumping of the suspension pump 317 and reading its flow rate, for example through flow meter 321.

With time, the pumping power requirement will increase, since the present system is a closed loop cycle. Such increased pumping power requirement indicates that the dispersed particles are starting to lose their dispersion stability. When this happens, the user has the option to set one or more fins 115 that function as turbulators (using the external control system to be used to add additional mixing to the flowing suspension. Fins 115 in providing the different stage turbulators will rise at different angles, by way of non-limiting example, from 0 degrees to 90 degrees. Fins 115 can then he retracted to their initial position (e.g., 0 degrees) after the pumping power goes back to its starting operational reading.

Additional flow restriction passages, such as flow restriction passage 101*a,* may be provided. The additional flow restriction passages may have flow restriction controlled, as depicted by separate drive gear 131*a.*

In the above example, is noted that, after achieving the additional mixing and stabilizing the suspension, the fins will go back to their initial position (e.g., 0 degrees). When the pumping power requirement is back to its initial status, this may be interpreted as the suspension having re-stabilized. In additional to the previously described operation, the operator can manually control the angles of fins 115 (i.e., increase or decrease their angles) for all turbulator stages if desired. The system can be adopted in large scale systems that use suspensions as working fluids. Additionally, the turbulators are able to extend the lifetime and efficiency of the working fluid by causing mixing and as a result of the control of fins 115 in response to pumping.

In one non-limiting modification, the flow restrictor fins 115 are intraoperative with the control of pump 317 and is incorporated in a feedback loop with pump 317. This allows flow restrictions, flow rate and power provided to operate pump 317 to be used to evaluate the flow characteristics of the material passing through the system.

The parts used in the proposed device can be replaced with others that are made from the same material of the targeted application to reflect the actual friction effect caused from the pipes on the dispersed particles physical stability within the flowing suspension.

The disclosed technique includes a method for measuring flow characteristics. The method utilizes the device and systems as described herein. In particular, the method includes the steps of providing a sample material for measurement of flow characteristics; passing the sample material through a flow restriction passage; controllably moving a plurality of movable fins into and out of the flow restriction passage; and measuring flow or flow resistance through the flow restriction passage with the movable fins moved into and out of the flow restriction passage.

In particular aspects of the disclosed method for measuring flow characteristics, a pump is used to provide flow from a flow supply source through the flow restriction passage and power used to power the pump sufficiently to maintain a predetermined flow through the flow restriction passage is measured, and thereby providing a comparison between the power required to maintain the predetermined flow with the movable fins extended into the flow restriction passage and the power required to maintain the predetermined flow with the movable fins not extended into the flow restriction passage. Further, moving of the fins interoperatively with the pump is also controlled, with the position of the movable fins and power required to maintain a predetermined flow through the flow restriction passage providing data to evaluate flow characteristics of the material passing through the system.

The disclosed technique, device, method and system provide the following aspects:

1. The technique determines and improves the physical stability of dynamically flowing nanofluids and microfluids under different flow conditions.

2. The technique provides for fabrication of the suspension performed within the device, and hence no additional mixing would be done from transferring the suspension from an external fabrication system to the disclosed device. It is further contemplated that additional steps outside the device may result in mixing that would change the level of physical stability of the suspension.

3. The suspension temperature can be controlled by the user at the fabrication stage.

4. The material used in the constructional parts of the device can be exchanged with those that are used in an actual targeted production application to determine the effect of the surface roughness and wettability of the parts used in the production application on the physical stability of the dispersion. In other words, the effect of the particular material on the stability of the dispersion can be seen.

The user is able to add as many turbulators as desired in the system, as well as any number of devices.

6. This technique can easily be directly adopted to actual systems existing in real-life applications regardless of the size by just adding the proposed turbulators. The size of the turbulators can vary depending on the targeted system piping inner diameters to the real-life production applications. Pumps may be connected in the real-life production applications, as well as flow rate sensor to our external controlling system.

Closing Statement

It will be understood that many additional changes in the details, materials, steps and arrangement of parts, which have been herein described and illustrated to explain the nature of the subject matter, may be made by those skilled in the art within the principle and scope of the invention as expressed in the appended claims.

What is claimed is:

1. A flow characteristics measurement and enhancement apparatus comprising:
   a flow supply source containing a suspension;
   a flow restriction passage;
   a plurality of movable fins extendable into the flow restriction passage;
   an actuator controlling the movable fins;
   a flow measurement device capable of measuring flow or flow resistance through the flow restriction passage;
   a pump providing flow of the suspension from the flow supply source through the flow restriction passage; and
   a drive circuit for the pump providing driving current to operate the pump, the drive circuit providing an indication of power required to maintain a predetermined flow through the flow restriction passage, and thereby provide a comparison between the power required to maintain the predetermined flow with the movable fins extended into the flow restriction passage and the power required to maintain the predetermined flow with the movable fins not extended into the flow restriction passage.

2. The flow characteristics measurement and enhancement apparatus of claim 1, wherein:
   the actuator controlling the movable fins controlled as interoperative with the drive circuit for the pump, with the position of the movable fins and power required to maintain a predetermined flow through the flow restriction passage providing data to evaluate flow characteristics of the material passing through the system.

3. The flow characteristics measurement and enhancement apparatus of claim 1, further comprising:
   a gear actuator causing the movable fins to extend or retract into the flow restriction passage, the gear actuator comprising a rotating gear driving a plurality of driven gears corresponding to the plurality of the movable fins, whereby rotation of the rotating gear causes the plurality of movable fins to synchronously extend or retract.

4. The flow characteristics measurement and enhancement apparatus of claim 1, further comprising:
   a pump;
   a pump controller; and
   a flow measurement device,
   wherein the pump controller causes the pump to maintain flow at a predetermined flow rate, and power used to maintain the flow at the predetermined flow rate.

5. A method for measuring flow characteristics, the method comprising:
   providing a sample material for measurement of flow characteristics;
   passing the sample material through a flow restriction passage;
   controllably moving a plurality of movable fins into and out of the flow restriction passage;
   measuring flow or flow resistance through the flow restriction passage with the movable fins moved into and out of the flow restriction passage;
   using a pump to providing flow from a flow supply source through the flow restriction passage; and
   measuring power used to power the pump sufficiently to maintain a predetermined flow through the flow restriction passage, and thereby provide a comparison between the power required to maintain the predetermined flow with the movable fins extended into the flow restriction passage and the power required to maintain the predetermined flow with the movable fins not extended into the flow restriction passage.

6. The method of claim 5, wherein:
   controlling the moving of the movable fins interoperatively with the pump, with the position of the movable fins and power required to maintain a predetermined flow through the flow restriction passage providing data to evaluate flow characteristics of the material passing through the system.

7. The method of claim 5, further comprising:
   using a gear actuator to extend or retract the movable fins into the flow restriction passage by rotating a rotating gear to drive a plurality of driven gears corresponding to the plurality of the movable fins, whereby rotation of the rotating gear causes the plurality of movable fins to synchronously extend or retract.

8. A flow characteristics measurement and enhancement apparatus comprising:
   means for providing a sample material for measurement of flow characteristics;
   means for passing the sample material through a flow restriction passage;
   means for controllably moving movable restriction means extendable into the flow restriction passage;
   means for measuring flow or flow resistance through the flow restriction passage with the movable restriction means extended and not extended into the flow restriction passage;
   the means for providing a sample material for measurement of flow characteristics comprising using a pump to provide flow from a flow supply source through the flow restriction passage; and
   means for measuring power used to power the pump sufficiently to maintain a predetermined flow through the flow restriction passage, and thereby provide a comparison between the power required to maintain the predetermined flow with the movable restriction means extended into the flow restriction passage and the power required to maintain the predetermined flow with the movable restriction means not extended into the flow restriction passage.

9. The flow characteristics measurement and enhancement apparatus of claim 8, wherein:
   the means for controllably moving the movable restriction means extendable into the flow restriction passage, and controlling the movable fins with actuators, and providing the data for measurements of the position of the movable fins and power required to maintain a predetermined flow through the flow restriction passage and monitoring flow characteristics of the material passing through the system.

10. The flow characteristics measurement and enhancement apparatus of claim 8, further comprising:
    using a gear actuator to extend or retract the movable restriction means into the flow restriction passage by rotating a rotating gear to drive driven gears corresponding to elements of the movable restriction means, whereby rotation of the rotating gear causes the elements of the movable restriction means to synchronously extend or retract.

\* \* \* \* \*